(12) United States Patent
Kords et al.

(10) Patent No.: US 8,313,268 B2
(45) Date of Patent: Nov. 20, 2012

(54) METHOD FOR FILLING AND EMPTYING TRANSPORT CONTAINERS WITH PLASTICS GRANULAR MATERIAL

(75) Inventors: Christian Kords, Krefeld (DE); Reiner Horl, Kempen (DE); Uli Franz, Solingen (DE); Raimund Zimmermann, Langenfeld (DE); Norbert Schniesko, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 1192 days.

(21) Appl. No.: 12/112,398

(22) Filed: Apr. 30, 2008

(65) Prior Publication Data
US 2008/0296295 A1    Dec. 4, 2008

(30) Foreign Application Priority Data

May 16, 2007  (DE) .......................... 10 2007 023 098
Jul. 10, 2007  (DE) .......................... 10 2007 032 017

(51) Int. Cl.
*B65G 53/40*  (2006.01)
(52) U.S. Cl. .............. 406/109; 406/39; 141/10; 141/67; 414/298; 414/809; 220/1.6
(58) Field of Classification Search .................. 141/10, 141/67, 114, 314–316; 406/38–44, 109; 414/800, 808–810, 298, 345, 346; 220/1.5, 220/1.6

See application file for complete search history.

(56) References Cited

U.S. PATENT DOCUMENTS

| 3,696,952 | A |   | 10/1972 | Bodenheimer |
| 3,951,284 | A | * | 4/1976  | Fell et al. ........................ 414/812 |
| 4,966,310 | A | * | 10/1990 | Hawkins ........................ 222/105 |
| 4,988,240 | A | * | 1/1991  | Thompson ..................... 406/166 |
| 5,096,336 | A | * | 3/1992  | Merrett et al. ................... 406/39 |
| 5,199,826 | A | * | 4/1993  | Lawrence ......................... 406/41 |
| 5,244,332 | A | * | 9/1993  | Krein et al. .................... 414/467 |
| 5,369,188 | A |   | 11/1994 | Kim |
| 5,378,047 | A | * | 1/1995  | Merrett et al. .............. 298/17 R |
| 5,531,361 | A |   | 7/1996  | Podd et al. |
| 5,547,331 | A | * | 8/1996  | Podd et al. ..................... 414/808 |
| 5,868,528 | A |   | 2/1999  | Howanski et al. |

(Continued)

FOREIGN PATENT DOCUMENTS

DE      3539619 C1    4/1987
(Continued)

*Primary Examiner* — Timothy L Maust
(74) *Attorney, Agent, or Firm* — Connolly Bove Lodge & Hutz LLP

(57)    ABSTRACT

A method for the filling and optionally emptying transport containers with plastics granular materials is disclosed. A flexible plastics inliner is inserted into a transport container. A front side of the inliner includes at least one receiving flexible hose connection for filling the inliner with plastics granular material, at least one discharge hose connection for discharging blown in conveying air from the inliner, and at least one emptying hose connection for emptying plastics granular material from the inliner. The front side of the inliner also includes a protective liner. The cabin and the transport container are positioned at a decanting station, the cabin being adapted to transfer plastics granular material from the decanting station and decant the transferred plastics granular material into the transport container through the receiving hose connection. The transport container is then filled with plastics granular material utilizing the cabin.

6 Claims, 2 Drawing Sheets

U.S. PATENT DOCUMENTS

| | | | |
|---|---|---|---|
| 5,890,611 A | 4/1999 | Podd | |
| 5,975,642 A * | 11/1999 | Dibble et al. | 298/17 R |
| 6,409,274 B1 * | 6/2002 | Merrett | 298/17 R |
| 6,481,598 B1 | 11/2002 | Thornsen et al. | |
| 6,499,585 B2 * | 12/2002 | Mitchell et al. | 198/550.8 |
| 6,508,378 B1 | 1/2003 | Maeda et al. | |
| 2005/0161451 A1 | 7/2005 | Maginot et al. | |
| 2007/0048110 A1 * | 3/2007 | Boroch | 414/340 |
| 2010/0080677 A1 * | 4/2010 | Heinzen et al. | 414/298 |

FOREIGN PATENT DOCUMENTS

| | | |
|---|---|---|
| DE | 101 22 885 | 11/2002 |
| EP | 062768 A1 | 2/1991 |
| EP | 1101712 A1 | 5/2001 |
| EP | 1 354 823 | 10/2003 |
| EP | 1 557 376 | 7/2005 |
| WO | WO 80/01793 | 9/1980 |
| WO | WO-00/41950 A1 | 7/2000 |

\* cited by examiner

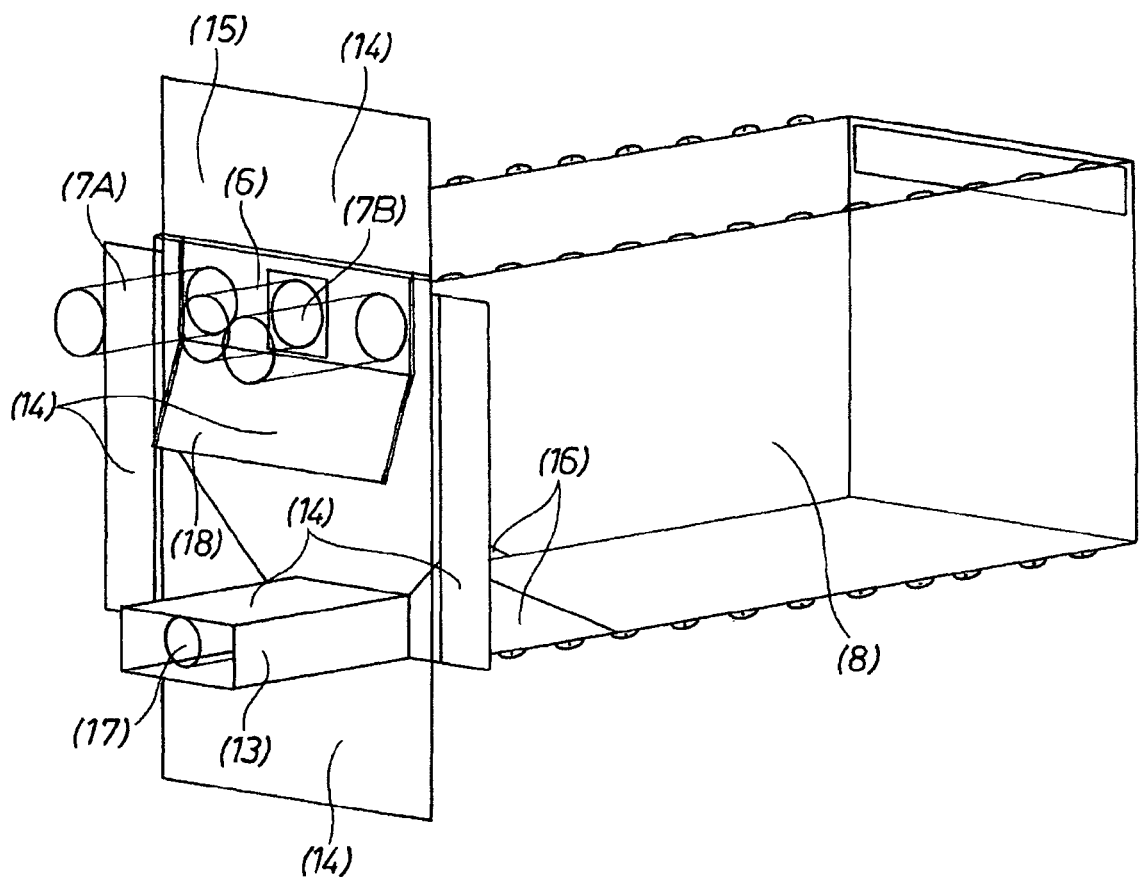

METHOD FOR FILLING AND EMPTYING TRANSPORT CONTAINERS WITH PLASTICS GRANULAR MATERIAL

BACKGROUND OF THE INVENTION

1. Priority

Priority is claimed to German Patent Application No. 10 2007 032017, filed Jul. 10, 2007, and to German Patent Application No. 10 2007 023098, filed May 16, 2007. German Patent Application No. 10 2007 032017 and German Patent Application No. 10 2007 023098, and the references cited therein, are incorporated by reference in their entirety for all useful purposes.

2. Field of the Invention

The field of the present invention is methods for filling and optionally emptying transport containers with plastics granular materials, emptying and filling systems therefore, as well as an inliner for use with transport containers to be filled or optionally emptied, and the use thereof.

3. Background

It is known to decant high-purity polycarbonate granular materials into big-bags to avoid contamination with foreign substances, or to empty the granular materials therefrom into other containers. Thus for example a bag-type collapsible container with an inliner, and also with filling and emptying hoses, is described in DE-A 35 39 619, which protects the transported material against contamination by impurities during decanting, transporting and emptying operations. The disadvantage of such big-bags is the relatively small capacity of ca. 800 to 1,000 kg and the unfavourable stacking volume and/or the resultant loss of load of ca. 4 tonnes of granular materials in 20 foot overseas containers, since instead of 20 tonnes in the case of a loose load, only ca. 16 tonnes can be accommodated in the form of stacked big-bags in a 20 foot container.

In the past there has been no lack of attempts to find suitable solutions to this problem of lost capacity in transport containers. Thus for example in WO-A 2000/41950 a silo vehicle is described for the bulk transportation of relatively large amounts of polycarbonate granular material, which enables the granular material to be handled while avoiding contamination with foreign substances, These silo vehicles are not economically feasible for use in overseas transportation and over long transport routes. In addition, this type of transportation has the disadvantage that the silo container can only be used in each case for the same goods, or that a complicated and expensive cleaning of the container is necessary if the material being transported is changed. This seriously complicates the procurement and deployment of the transporting means, especially for overseas traffic.

Accordingly there have already been suggestions to use inexpensive liners, known in specialist circles as so-called "inliners", as replaceable protective sleeves in the interior of transport containers, which can have any desired shape and with the aid of which the above disadvantages can be overcome. This preference for the use of inliners in containers for transporting bulk goods has already been described in U.S. Pat. No. 3,696,952. There techniques are described for filling the inliner with bulk goods and for discharging the displaced air to the outside, and also emptying the inclined container via a chute inserted into the emptying opening. The filling procedure involves the use of pipes which are inserted into existing openings in the inliner, and are removed therefrom after the filling procedure; the remaining openings are sealed with thick paper for the transportation. Openings which are sealed in this way cannot guarantee the present stringent demands on hermeticity and reliably exclude contamination.

A method for emptying inliners in transport containers while avoiding damage to the inliner film is described in EP-A 627 368. In this, a transporting gas is blown under high pressure into the inliner of the horizontally arranged container, and at the outlet opening the bulk goods together with the transporting gas is discharged from the inliner through a pipe connection by applying a reduced pressure. Since the container does not have to be inclined, as is the case with discharge under gravity, the inliner cannot slip during the emptying procedure and is therefore also not damaged. The application of reduced pressure however runs the risk, even with only slightly non-hermetic pipeline connections, of drawing in air from the surroundings, and thus also runs the risk of contaminating high-purity granular materials with undesirable foreign particles. Accordingly, in a method employing reduced pressure extremely high demands are placed on the hermeticity of the pipelines that are used.

A method for emptying transporting means, for example railway wagons in enclosed facilities in order to avoid contaminating the flowable product to be decanted with impurities from the surroundings, is described in U.S. Pat. Nos. 5,639,188 and 5,868,528. The enclosed facilities that are used are in this connection sufficiently large so that the whole transporting arrangement (railway wagons, transporting containers) can be accommodated therein. By blowing in finely filtered, purified air by means of a circulation system no contamination with foreign substances or particles occurs when granular material comes into contact with the ambient atmosphere when the transporting device is opened. The conveyance of the material likewise takes place under reduced pressure and with purified air. The enclosed facilities required for this method are so large and the provision of filtered air is so costly, that the expenditure involved in a large number of discharge and decanting devices for granular materials is too high. Accordingly there is a need for a technically simpler but nevertheless reliable solution.

There was accordingly also a need for an economically advantageous and reliable method for decanting high-purity plastics granular materials, in particular polycarbonate granular material used for example for the manufacture of CDs, DVDs and other optical data carriers, while avoiding contamination by impurities in these decanting procedures, which can seriously affect the quality of the products. Since such contaminations can occur along the whole logistics chain, there was furthermore a need to provide such a method that is suitable for the filling procedure as well as the emptying procedures and also for the employed transporting means. In this connection contact with contaminating foreign substances should in particular be avoided in all decanting procedures and during transportation. Since this technical solution also requires appropriate measures to be taken by the customer, it should be able to be carried out simply and reliably, and should be inexpensive. In addition an optimal space utilisation and the necessary provision and arrangement of overseas containers also have to be taken into account.

An object of the present invention is accordingly to provide such an economically advantageous and reliable method for granular material decanting procedures as well as the necessary technical systems and equipment for use in this method that do not have the disadvantages of the prior art.

SUMMARY OF THE INVENTION

The present invention is directed toward a method and system for filling and optionally emptying transport containers with plastics granular materials. Overseas containers of any arbitrary size may be equipped with suitable replaceable inliners provided with a special protective liner. Further, container filling systems and, optionally container emptying systems may be constructed and made available in the way described hereinafter to service such overseas containers. In this way, on the one hand the cleaning of containers to remove impurities and residues of granular material is avoided, and on the other hand, the high-purity polycarbonate granular material in the inliners is optimally protected against impurities. By using such matching inliners the capacity of the overseas containers can be optimally and better utilised than if stackable small bags were used. Also, a change of product as regards the plastics granular material to be transported is possible without any further measures, since no contamination of the transport container with the transported goods occurs.

Accordingly a method for filling transport containers with plastics granular materials is disclosed, comprising inserting a flexible plastics inliner into a transport container, wherein a front side of the inliner includes at least one receiving flexible hose connection for filling the inliner with plastics granular material, at least one discharge hose connection for discharging blown in conveying air from the inliner, at least one emptying hose connection for emptying plastics granular material from the inliner, and a protective liner;

positioning a cabin and the transport container at a decanting station, the cabin being adapted to transfer plastics granular material from the decanting station and decant the transferred plastics granular material into the transport container through the receiving hose connection; and filling the transport container with plastics granular material utilizing the cabin.

The cabin for filling the transport container is in this connection preferably a transportable cabin which is accessible on foot, which for this purpose is provided with access and egress openings. Preferably clean room conditions prevail in the cabin. In the context of this disclosure, clean room conditions are understood to mean that clean air of Class 5 according to VDI 2083 Luftstrom, is blown, preferably as a laminar air flow, into the cabin.

BRIEF DESCRIPTION OF THE DRAWINGS

The figures describe the invention by way of example and should not be regarded as limiting the latter.

FIG. 3 is a diagrammatic representation of an inliner with a protective liner.

DETAILED DESCRIPTION OF THE PREFERRED EMBODIMENTS

Figure 1:
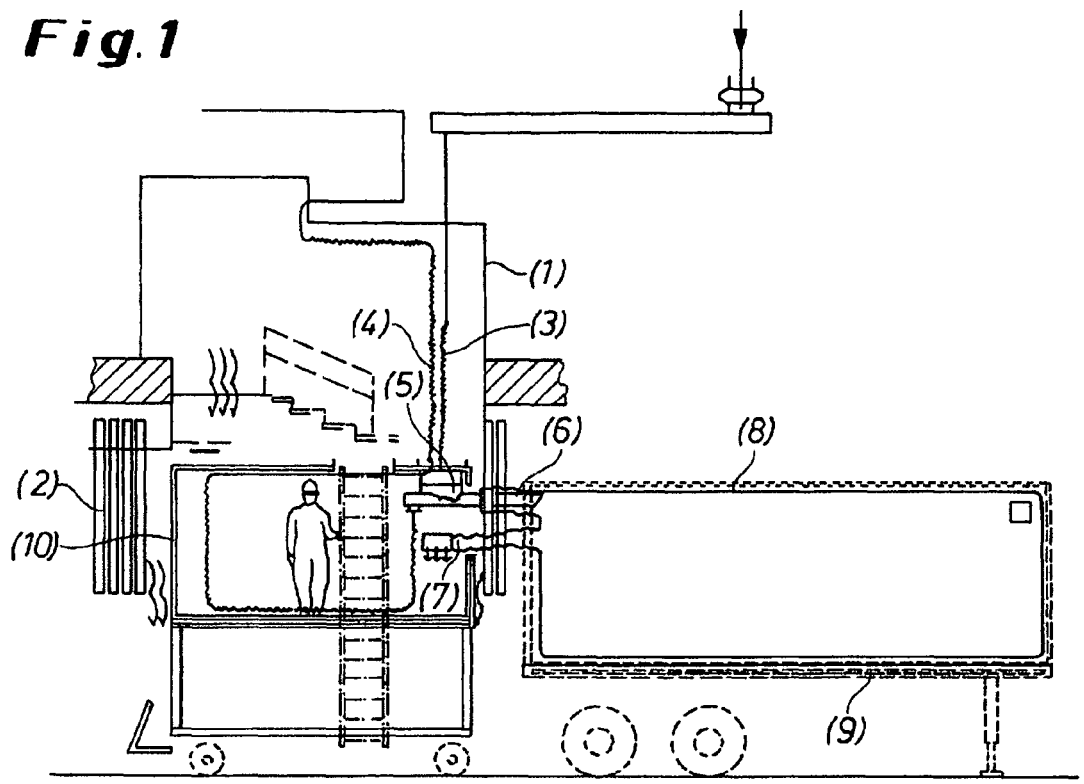
FIG. 1 is a diagrammatic representation of a filling device.

In a preferred embodiment, a drivable cabin closed all the way round is used to fill the transport container, in which before the start of operations the cabin can be positioned underneath an existing decanting site for granular material so that all necessary connections of lines to one another can be effected without any problem. In order to protect against transverse flows from the ambient atmosphere, the docking region between the cabin and decanting site is preferably protected by laterally hanging, closed curtains. Behind these curtains a laminar dust-free air flow directed from the top downwards, i.e. preferably an air flow according to clean room conditions, prevents entry of dust particles from the surrounding air.

The roof of such a cabin preferably contains a plurality of closable openings, through which in the closed state the preferably flexible connections of the granular material conveying line as well as of the compressed air line of the decanting site to the corresponding connection pieces in the drivable cabin can be implemented. These connection pieces can in preferred embodiments be connected preferably directly to a granular material conveying device installed in the cabin, preferably to an injector, and more preferably to a pneumatic injector. The granular material conveying device is preferably incorporated so that the outlet opening through which the granular material flows is positioned on the front wall of the cabin, against which stands the transport container with its loading opening.

By means of closable openings in this front wall of the cabin, i.e. the side directed to the transport container, preferably flexible connections to the transport container standing directly therebehind can be implemented. Thus for example the outlet opening of the granular material conveying device, which is preferably in the shape of a large nozzle, is connected to a hose connection for filling the inliner from the transport container. The granular material to be conveyed thus follows in this preferred embodiment the path from the decanting site via a preferably flexible hose connection to the granular material conveying device, and is there blown in the case of a pneumatic conveyance with compressed air through a hose connection into the inliner of the transport container. The compressed air escaping from the inliner is discharged during the preferably pneumatic conveying procedure, preferably through two—but possibly also only one or more than two—further hose connections on the inliner into the drivable cabin, and from there via ducts to the outside. For this purpose there are provided on the cabin further connection pieces, preferably in the shape of large nozzles, onto which these hose ends for the escaping air can be fastened by means of clamping rings.

The cabin itself is preferably charged with dust-free compressed air from the decanting station in such a way that a downwardly directed laminar air flow is produced, whereby foreign particles from the surrounding air cannot come into contact with the plastics granular material.

A preferred embodiment of such a cabin is described by way of example in FIG. 1. The cabin (10) according to FIG. 1 is positioned underneath an existing decanting site (1) for granular material in such a way that all necessary connections of lines to one another can be implemented without any problem, and is protected by laterally hanging, closed curtains (2) against surrounding air. In the roof of the cabin are located closable openings for the flexible connections of the granular material conveying line (3) as well as for the compressed air line of the decanting site (4), which are directly connected to a pneumatic injector (5) installed in the cabin. The injector outlet opening is connected to the hose connection for filling (6) the inliner (8) in the transport container (9). By means of further hose connections on the inliner (7), the compressed air escaping from the inliner is discharged through ducts in the cabin to the outside. For perspective reasons the protective liner is not illustrated in FIG. 1, though of course is present within the scope of the invention.

The lines between the decanting station and the injector, for example the granular material conveying line as well as the compressed air line, are preferably flexible. They can be made of various materials, but are preferably made of a material that is resistant to abrasion by the granular materials. Such a material is for example stainless steel. Preferably the lines are made of stainless steel mesh (woven fabric) with an internal stainless steel tube. Particularly preferably they are joined by flange-type connections. The connections between the transport container and cabin can likewise be made of various materials. These connections are also preferably flexible. Preferably these are the hose connections of the inliner, which are formed as plastic hose end pieces from the material of the inliner, which are slipped over the corresponding counterpieces, preferably formed as nozzles, on the cabin and are fastened in place with clamping rings.

The plastics granular material can be conveyed from the existing decanting devices by means of various granular material conveying devices into the inliner. Conveyer belts, for example so-called granular material ejectors or centrifugal belts, or injectors, are suitable for this purpose.

Conveyer belts, for example so-called granular material ejectors or centrifugal belts, are known to the person skilled in the art and are commercially available. They are marketed for example by the company SSB Wägetechnik GmbH.

Preferably the plastics granular material is conveyed from the existing decanting devices pneumatically by means of an injector into the inliner of the transport container. Particularly preferably dry, dust-free compressed air is used for the conveyance. As used herein, dry compressed air is understood to be preferably compressed air with a dew point of less than −15° C., and dust-free compressed air is understood to be preferably compressed air that has been filtered with a H 13 filter and a downstream connected 30 µm candle filter.

The pneumatic conveyance of granular material is in principle known to the person skilled in the art and can be carried out with commercially available injectors. As regards the choice of material, the injectors can however also be adapted to the particular properties of the corresponding plastics granular material. Various materials, such as for example steel, aluminium, stainless steel, etc., are suitable as materials for injectors. For polycarbonate granular material, which is the particularly preferred type of plastics granular material, suitable materials are preferably those that are resistant to abrasion by polycarbonates. Stainless steel is a particularly suitable material for this purpose.

The injector that is used can be arranged preferably movably, in order to ensure a satisfactory filling of the inliner in the transport container. The employed compressed air is preferably dry and dust-free, and can be purified for example in a 3-stage filter unit consisting of flat paper filters of filter sizes F6, F9 and H13. The amount of conveying air per kg of granular material is preferably between 0.8 and 2.5 $Nm^3$, more preferably between 1.0 and 2.0 $Nm^3$, and particularly preferably between 1.5 and 1.6 $Nm^3$. The pressure of the conveying air at the inlet of the injector is preferably between 0.5 and 2.0 $bar_{ü}$, more preferably between 0.8 and 1.5 $bar_{ü}$, and particularly preferably between 0.8 and 1.0 $bar_{ü}$ ($bar_{ü}$, =bar excess pressure).

The conveying air recycled to the cabin from the inliner is preferably discharged to the outside.

In the particularly preferred embodiment, in which polycarbonate granular material is used as plastics granular material, it is particularly advantageous if all constituents of the cabin that come into contact with the granular material are made of stainless steel, i.e. in particular the granular material conveying line between the decanting station and the injector, and the injector itself.

The transport container can be any arbitrary container that is suitable for transporting plastics granular materials. Large-volume containers suitable for overseas transportation are preferred. Preferably the container is a standard overseas container with a loading opening on a front side and a length of 20 feet (6 meters). A flexible so-called "inliner" of plastics material, which practically fills the whole free volume of the container, is inserted into the transport container before the filling procedure.

The inliner can be made of any suitable flexible plastics material. Preferred is a plastics material that is abrasion resistant to the granular material to be conveyed. Preferably the inliner is made of a polyethylene material.

Depending on the purity requirements placed on the plastics granular material to be transported, in order to prevent the granular material being contaminated by foreign particles from the inliner it may be advantageous to fabricate and weld the inliner preferably under clean room conditions.

The inliner has a plurality of hose connections, these preferably all being positioned on the same front side. When inserting the container into the inliner, this front side would be facing towards the side on which also the loading opening of the container is located. The hose connections are preferably designed in the form of hose end pieces and particularly preferably are made of the same material as the inliner. These hose connections serve in the filling procedure for the blowing in of the granular material, the removal of the conveying air, as well as the emptying of the filled inliner.

In a preferred embodiment of the inliner this comprises at least four hose connections on the front side. In this connection three of these hose connections are located in the upper region of the front side and are used in the filling procedure for blowing in the granular material and removing the conveying air. Normally in this case one hose connection serves for blowing in the granular material and two hoses serve to remove the conveying air. The fourth hose connection is preferably located in the lower region of the front side of the inliner and is used for emptying purposes. Such inliners are already known, are commercially available, and are also described in the cited prior art; see U.S. Pat. No. 6,481,598 B1, U.S. Pat. No. 5,531,361 and EP-A 1 101 712.

The inliner is provided with an additional protective liner. This protective liner is preferably likewise hermetically joined to the inliner. In this connection the inliner can either be securely joined to this protective liner, for example by bonding or welding, or preferably can simply be installed together with the latter in the corresponding container, without forming such a secure connection. Such an installation can take place for example if, after introducing the inliner into the container, the protective liner is mounted with the hose connections in front of the front side of the inliner and fastened for example on the inside of the container. Slipping during charging, transporting and emptying procedures can thus be avoided.

The protective liner is preferably made of a plastics woven fabric. Suitable for this purpose are for example polyethylene, polypropylene or polyester fabric. In preferred embodiments this is polyethylene woven fabrics. Such plastics woven fabrics, in particular polyethylene woven fabric, are known to the person skilled in the art. In this connection they may for example be multifilament woven fabrics. In preferred embodiments these are multifilament woven fabrics, in particular polyethylene woven fabrics, with a thread strength of 130 to 200 $g/m^2$, particularly preferably 150 to 190 $g/m^2$. The thread strength can in this connection preferably have a variation range of ±3% to ±8%, particularly preferably ±5%.

The protective liner serves to protect the inliner. Inter alia it serves in the filling and/or emptying of the inliner to protect at least one of the hose connections, and during the filling and/or emptying procedure to protect the hose connection coupled thereto, between the inliner and cabin, against external weather influences, for example during decanting processes in the open air. The protective liner therefore preferably includes at least one connection piece, which surrounds and thus protects at least one of the hose connections and during the filling and/or emptying procedure surrounds and thus protects the hose connection coupled thereto between the inliner and cabin. Preferred embodiments of such a protective liner are described hereinafter. In preferred embodiments such a connection piece surrounds the hose connection during emptying, and during the emptying procedure surrounds the hose connection coupled thereto between the inliner and cabin. The connection piece is fastened to the emptying cabin preferably before the filling and/or emptying procedure, and according to the aforementioned preferred embodiment is fastened before the emptying procedure. Advantageously only after this is the corresponding hose connection of the inliner for the filling and/or emptying procedure, according to the aforementioned preferred embodiment for the emptying procedure, taken through an opening from the cabin and through the duct that is formed by the connection piece of the protective liner, and fastened to the corresponding filling or emptying conveying device in the cabin, for example to the injector outlet opening in the filling cabin or to the rotary vane airlock in the emptying cabin. The squeezing off of the hose connections after completion of the filling or emptying procedure likewise advantageously takes place so long as the connection piece of the protective liner is still fastened to the cabin. In this way foreign particles from the surroundings are prevented from entering during the squeezing on procedure of the hose connections.

In further preferred embodiments the protective lining includes an additional flap, which serves to protect the hose connections for the filling procedure. The flap can for this purpose preferably be tilted for the transporation via the corresponding hose connections and can be arrested with suitable securement devices, preferably those that do not damage the protective liner, such as for example simple burr-type closures. In further preferred embodiments the protective liner can comprise one or more, preferably four panels on the four edges, which project beyond the dimensions of the front side of the inliner. These panels can be advantageous as regards the hermeticity during the filling and/or emptying procedure of the inliner, since these are pressed against the container wall due to the weight of the plastics granular material in the emptying procedure, and also due to the compressed air in the filling procedure.

The inliner furthermore contains in a preferred embodiment at least two chambers that can be inflated with compressed air, which by inflation in the emptying procedure ensure that the otherwise conventional corners of the rectangular inliner then form inclined surfaces on the front side, so that a complete emptying of the container becomes possible in the inclined state. To inflate these chambers, in this preferred embodiment corresponding further hose connections for compressed air are provided on the inliner.

FIG. 3 shows diagrammatically a preferred embodiment of an inliner (8) with such a protective liner (14). The inliner has two chambers (16) inflatable with compressed air, and on the front side four hose connections (6), 7A, 7B and (17), of which the hose connection (6) serves for the filling of the inliner with plastics granular material, the hose connections 7A and 7B serve for the excess compressed air, and the hose connection (17) serves for emptying the inliner. The connection piece (13) of the protective inliner surrounds the hose connection (17), and the flap (18) can be tilted upwards and locked in position to protect the hose connections (6), 7A and 7B for transportation. In addition the protective liner (13) comprises panels (15) on the edges. The shape of the connection piece is shown in FIG. 3 in rectangular cross-section, though in other embodiments it can have arbitrary different cross-sections, such as for example round or oval, which can optionally also increase or decrease in the direction of the inliner.

Such inliners with additional protective liners have not hitherto been described in the prior art. The inliners are normally used like a disposable packaging, and after use can be disposed of or used for other purposes, in which no such stringent demands are placed on the purity of the transported goods.

During the transportation the hose connections of the inliner are tightly sealed by suitable clamping connections and are protected by the protective liner against dirt and contamination.

Since potential sources of impurities for the granular material exist along the whole logistics chain, it would be particularly advantageous and was also therefore also desirable to ensure the purity of the granular material from the producer to the customer. This would include the aforementioned steps of the handling of the granular material during decanting at the manufacturer or supplier of the granular material, through the transporting means, as well as the reception of the granular material by the purchaser, i.e. the emptying of the transport container. Surprisingly the method described hereinbefore is suitable for such a procedure if it is supplemented by simple measures for the emptying of the container by the purchaser.

A method for the filling and emptying of transport containers with plastics granular materials is also disclosed, characterised in that the filling procedure is carried out according to the method described hereinbefore, and the emptying of the transport container is carried out by means of a cabin with devices for the transfer of plastics granular material from at least one hose connection of the flexible plastics inliner of the transport container and with devices for the further conveyance of the transferred plastics granular material, wherein the transport container is inclined during the emptying procedure.

The cabin for the emptying of the transport container is in this connection preferably a transportable cabin accessible on foot, which for this purpose is provided with openings for access and egress. Particularly preferably clean room conditions prevail in the cabin.

In a preferred embodiment a drivable cabin closed all the way round is used for the emptying of the transport container, which before the start of operations can be positioned underneath an existing filling site for granular material so that all necessary connections of lines to one another can be effected without any problem.

The cabin for the emptying of the transport container is preferably equipped with a rotary vane airlock, via which the granular material to be emptied from the container is preferably conveyed pneumatically to the storage silo. Preferably fixed flange connections to which flexible hoses for compressed air and conveyance of granular material can be connected, are located in the cabin wall. A front wall of the emptying cabin is inclined at an angle between 35° and 60°, preferably 40° to 50°, particularly preferably ca. 45°, so that a transport container can dock there with its front-side emptying opening likewise inclined at an angle between 35° and 60°, preferably 40° to 50° and particularly preferably at an angle of up to 45°. Due to the subsequent sliding of the inliner which is not fastened in the container, inflation with of air for the purposes of pressure equalisation is not necessary and damage to the inliner can be avoided.

Figure 2:
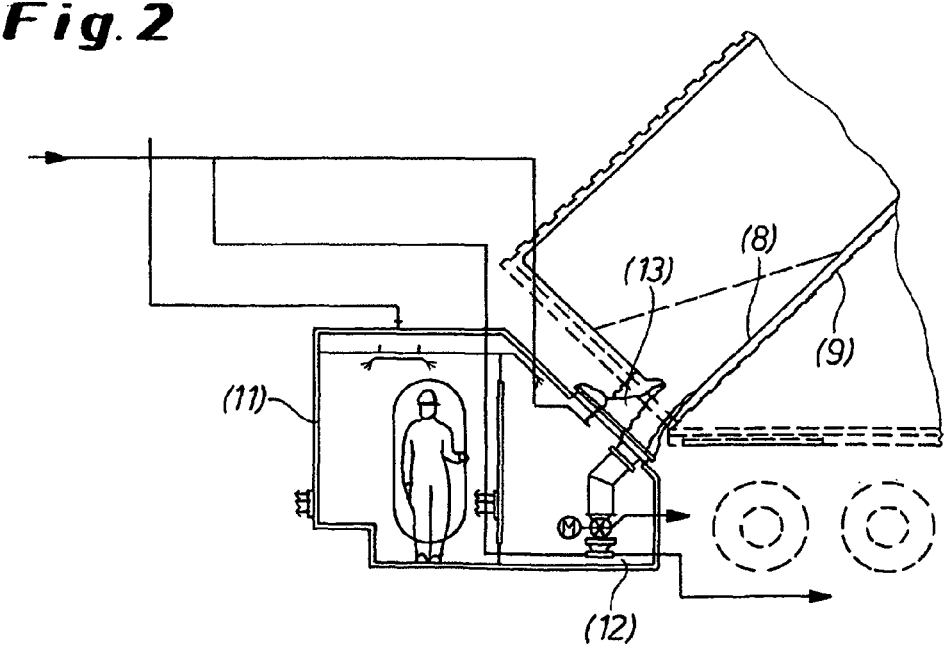
FIG. 2 is a diagrammatic representation of an emptying device.

A preferred embodiment of such an emptying cabin is described by way of example in FIG. 2. The cabin (11) according to FIG. 2 has a front wall inclined at an angle of 45° in the upper part, against which the transport container (9) is docked. The emptying cabin (11) is equipped with a rotary vane airlock (12) for the pneumatic conveyance of the granular material from the container (9). The container is provided with an inliner (8). The connection piece (13) of the protective liner surrounds the hose connection of the container to the emptying cabin.

In preferred embodiments in which the hose connection of the inliner is surrounded by a connection piece of the protective liner, this is fastened to the emptying cabin before the emptying procedure.

During the emptying the container is preferably constantly inclined up to the final setting of an angle between 35° and 60°, preferably 40° to 50° and particularly preferably at an angle of 45°, so that the outlet of the inliner is always covered with granular material.

In a preferred embodiment the at least two chambers of the inliner that can be charged with compressed air are additionally filled with compressed air. This charging of the chambers promotes during the emptying procedure a complete emptying of the container in the inclined state, since inclined surfaces are formed on the front side from the otherwise normal edges of the rectangular inliner.

In a preferred embodiment the inclined front wall of the emptying cabin contains on the outside a fixed, preferably oval-shaped device, preferably in the form of a nozzle, for fastening the connection piece of the protective liner from the transport container. The hose connection for emptying the inliner is connected to the interior of the cabin preferably by means of the rotary vane airlock. In this way the granular material can be conveyed from the transport container through a hose connection with tight clamp connections coupled to the hose connection for emptying the inliner, preferably via a rotary vane airlock and optionally an injector or conveyer belt through closed hose lines or pipelines to a storage silo. This hose connection coupled to the hose connection for emptying the inliner is preferably protected against impurities from the surroundings by the connection piece of the protective liner. This connection piece of the protective liner serves in particular to prevent contamination by impurities from the surroundings when decanting procedures are carried out in the open, and is already tightly installed in situ before the connection of the actual emptying hose, i.e. the hose connection. All other flexible hoses charged with compressed air are preferably joined to one another by tightly closing flange connections; the passageways through the cabin walls are hermetically sealed to the outside. Preferably the interior of the cabin accessible on foot is charged from above with a continuous, preferably dry and dust-free stream of air in order to avoid penetration of dust particles from outside, the said air stream escaping from the lower region of the cabin to the outside.

The method for the filling and emptying of large volume transport containers is particularly efficient in ensuring the purity of the transported plastics granular materials from the manufacturer to the customer. The measures that have to be adopted by the customer can be implemented simply and reliably, and are inexpensive. Also, the method provides a possibility for the optimum utilisation of space within the transport containers.

The methods for the filling, or filling and emptying, of large volume transport containers as well as the inliner, with the protective liner, are furthermore particularly suitable for use in overseas transportation. The use of reduced pressure is not necessary in any of the steps, and also a complicated cleaning of the container when the transported goods are changed can be dispensed with.

The methods for the filling, or filling and emptying, of large volume transport containers are suitable for all types of plastics granular materials. Such plastics granular materials are any polymer granular materials of widely differing granule size. Examples of such plastics granular materials are polycarbonate granular materials or polypropylene granular materials, preferred plastics granular materials being polycarbonate granular materials. The methods are particularly preferably employed in the transportation of high-purity plastics granular materials, for example for the manufacture of CDs, DVDs and other optical applications. Again, polycarbonate granular material is particularly preferred in this case.

A transport container emptying and filling system is also disclosed, comprising
   a cabin for the filling procedure, with devices for transferring plastics granular material from existing decanting devices and with devices for decanting the transferred plastics granular material;
   a transport container with a flexible plastics inliner, which on the front side comprises at least one hose connection for the filling of plastics granular material, at least one, preferably at least two flexible hose connections for discharging blown-in conveying air from the transport container, and at least one hose connection for emptying the contents; and
   a cabin for the emptying procedure, with devices for transferring plastics granular material from at least one hose connection of the flexible plastics inliner from the transport container and with devices for the further conveyance of the transferred plastics granular material; and
   the flexible plastics inliner is provided on the front side, which includes the aforementioned hose connections, with an additional protective liner.

The aforementioned preferred areas for the method according to the invention for the filling of transport containers as well as the method according to the invention for the filling and emptying of transport containers apply similarly in this case too.

The following examples serve only to illustrate the invention and should not be regarded as restrictive.

EXAMPLE 1

20 tonnes of polycarbonate granular materials (granule size 2.5×3.0 mm) were filled via a filling cabin according to FIG. 1 into a 20 foot container provided with an inliner according to the invention. For this purpose the compressed airline (4) as well as the granular material feed line (3) were connected directly to the injector (5) in the cabin through the openings in the roof of the cabin. Also, the injector outlet opening and the hose connection for the filling (6) of the inliner (8) were connected in the form of a movable air hose. The two waste air hoses (7) were laid in two oval-shaped waste air pipes in the cabin and pressed against the pipe walls by the exiting air stream. This exiting conveying air stream leaves the filling cabin (10) through two lateral waste air flaps. Clean air flowed through roof hatches into the filling cabin (10) in order to prevent entry of dust from outside.

The filling of the container (9) began after lining up the injector (5). For this purpose the valves for conveying air were adjusted to 1400 to 1800 $Nm^3$/hour and the polycarbonate granular material was conveyed at a pressure of 0.5 to 0.8 bar and a throughput of 10 to 15 tonnes/hour into the inliner of the container.

An emptying cabin according to FIG. 2 was used to empty the granular material from the inliner. To empty the granular material from the inliner (8) in the bulk container (9), this was accurately positioned against the emptying cabin (11) according to the invention. The emptying cabin was inclined at an angle of 45° on the front side so that the bulk container could be tilted up to this angle of inclination. An oval-shaped connection piece was located on this inclined surface, to which the protective liner (13) of the inliner from the bulk container was fastened from outside with Destako spanners. The filling hose (17, FIG. 3) was drawn out from the inside of the emptying cabin and fastened to the connection piece of the rotary vane airlock (12). In this way a connection between the inliner of the bulk container and the emptying cabin was formed, which was completely hermetically sealed to the outside even under unfavourable ambient conditions. The granular material was conveyed from the rotary vane airlock with compressed air in an amount of 1000 to 1400 $Nm^3$/hour at 0.5 to 0.8 bar from the bulk container via a flexible stainless steel hose (see broad arrow, FIG. 2) and through the conveying line into a storage silo.

In order to ensure clean room conditions during the emptying procedure the emptying cabin was charged with ca. 400 $Nm^3$ of compressed air/hour through a line, in order to prevent the entry of air from the outside. The charging air was extracted via the filter unit in the intermediate door. All the required compressed air was dry and dust-free.

The dust fraction in the decanted polycarbonate granular material was measured according to European Norm FEM 2482 (measurement method for determining fines and threads in plastics granular materials). The quality characteristic No. (QK) of the granular material was determined by means of a scanner test. For this, the sampling site was at the end of the conveying line from the emptying cabin. A QK of 2 and a dust fraction of 87 to 88 mg/kg were determined.

Description of the Quality Characteristic No. (QK)

The QK is measured on the final injection moulded article (in this case a CD disk), which is produced from the PC granular material to be tested. A non-metallised audio CD is measured in transmission with the aid of a laser scanner (HRD5 scanning equipment from the Dr Schenk company, Munich). The signals from the detection in the light field, in the dark field and the measurement values of the double refraction are evaluated. The measurement results are compared with the features of reference data sets. As regards the necessary cleanness for the further processing of a PC granular material, it is essential that the values fall below the data of all reference data sets, i.e. are below 100%. If the actual measurement data lie in the range 50 to 99%, the QK=2; if the data lie at 50%, the QK=1; if the data lie at >100%, the QK=3. The reference data sets are based on the definition of 20 classes of defects; the individual measurement value limits in these defect classes are defined by statistical methods.

Comparison Using Example 1

20 tonnes of polycarbonate granular material (granule size 2.5×3.0 mm) were filled for transportation purposes in big-bags without using the filling cabinet to be employed according to the invention. For this purpose the granular material Was filled via a suitable decanting device also using an amount of conveying air of 1400 to 1800 $Nm^3$/hour and a pressure of 0.5 to 0.8 bar and at a throughput of 40 tonnes/hour, into a corresponding number of big-bags.

As in Example 1, the dust fraction and QK of the decanted granular material were determined. In this case the sampling site was at the delivery point to the big-bag. A QK of 2 and a dust fraction of 90 mg/kg were determined.

EXAMPLE 2

20 tonnes of another batch of polycarbonate granular material (same granule size as in Example 1) were conveyed under the same conditions as in Example 1 to a 20 foot container and emptied again from the latter.

The dust fraction and QK of the decanted granular material were determined as in Example 1. A QK of 2 and a dust fraction of 77 mg/kg were determined.

Comparison Using Example 2

20 tonnes of polycarbonate of the same batch as in Example 2 were filled in big-bags as in Comparison Example 1.

The dust fraction and QK of the decanted granular material were determined as in Example 1. A QK of 2 and a dust fraction of 77 mg/kg were determined.

However, not all the 20 tonnes of decanted polycarbonate granular material from the decanted big-bags according to the comparison examples could be packed in one of the 20 foot containers, since these have an unfavourable stacking volume. On the other hand, 20 tonnes of polycarbonate granular material can be packed without any difficulty by the method according to the invention in the inliner of the 20 foot container. The examples thus show the advantages of the method according to the invention on the one hand as regards the optimal utilisation of the storage capacity of the transport containers, which is reflected inter alia in the improved economy of the transportation due to the reduction in the number of necessary containers.

Furthermore the examples show that the method according to the invention also enables the transport containers to be filled with polycarbonate granular material, in which the dust load can be maintained at the same high quality or can even be improved compared to the conventional big-bag filling.

After completion of the emptying procedure according to the method of the invention corresponding to Examples 1 and 2, the compressed air hoses as well as the granular material conveying hose were depressurised and decoupled. The inliner hose connections were disconnected in the reverse order to the connection procedure, and sealed. The emptied inliner can be removed complete from the bulk container and re-used for the transportation in another bulk container, or it can be re-used in the same bulk container for a renewed transportation.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

The invention claimed is:

1. A method for filling transport containers with plastics granular materials, the method comprising:
    inserting a flexible plastics inliner into a transport container, wherein a front side of the inliner includes at least one receiving flexible hose connection for filling the inliner with plastics granular material, at least one discharge hose connection for discharging blown in conveying air from the inliner, at least one emptying hose connection for emptying plastics granular material from the inliner, and a protective liner;

positioning a cabin and the transport container at a decanting station, the cabin being adapted to transfer plastics granular material from the decanting station and decant the transferred plastics granular material into the transport container through the receiving hose connection; and filling the transport container with plastics granular material utilizing the cabin, wherein clean room conditions prevail in the cabin.

2. The method according to claim 1, wherein the cabin is a transportable cabin that is accessible on foot.

3. The method according to claim 1, further comprising connecting the cabin to the inliner by slipping the hose connections of the inliner over counterpart nozzles on the cabin and fastening the hose connections to the counterpart nozzles using clamping rings.

4. The method according to claim 1, wherein filling the transport container includes conveying the plastics granular material into the inliner using a pneumatic injector coupled to the receiving flexible hose connection.

5. The method according to claim 4, wherein dry, dust-free compressed air is used for the conveying.

6. A method for filling transport containers with plastics granular materials, the method comprising:

inserting a flexible plastics inliner into a transport container, wherein a front side of the inliner includes at least one receiving flexible hose connection for filling the inliner with plastics granular material, at least one discharge hose connection for discharging blown in conveying air from the inliner, at least one emptying hose connection for emptying plastics granular material from the inliner, and a protective liner;

positioning a cabin and the transport container at a decanting station, the cabin being adapted to transfer plastics granular material from the decanting station and decant the transferred plastics granular material into the transport container through the receiving hose connection;

providing the cabin with dry, dust-free compressed air from the decanting station in such a way that a downwardly directed laminar airflow is produced; and filling the transport container with plastics granular material utilizing the cabin.

\* \* \* \* \*